United States Patent Office 3,329,602
Patented July 4, 1967

3,329,602
DEWAXING AND DEOILING PROCESS
Hallard C. Moyer, Homewood, Ill., assignor, by mesne assignments, to Sinclair Research, Inc., New York, N.Y., a corporation of Delaware
No Drawing. Filed Aug. 4, 1958, Ser. No. 753,134
22 Claims. (Cl. 208—31)

The present invention relates to an improved solvent extraction process for separating a mixture of petroleum oil and crude wax. More particularly, this invention is directed to an improved process for solvent dewaxing or solvent deoiling of a mixture of petroleum residual oil and crude wax.

The general process of solvent dewaxing petroleum oils by low temperature precipitation of wax from a solution of oil in one or more hydrocarbons and one or more ketones is widely used in the petroleum industry and is familiar to all those concerned with the art. The wax-bearing oils are blended with the solvent at a sufficiently high temperature to insure mutual solution and the mixture is cooled to a sufficiently low temperature to precipitate a wax phase. The cooling temperature is normally about 20 to $-15°$ F. or below, preferably about $-5$ to $-15°$ F. The wax phase is is then removed by filtering or centrifuging the mixture and the oil and wax products separately recovered by distilling off the volatile solvent. The wax yield, that is, the wax separated from wax-bearing oils often varies anywhere from about 5 to 50 volume percent of the mixture but is more commonly found to be about 10 to 30 volume percent.

Likewise, solvent deoiling of oil-containing crude wax is commonly conducted by a like method utilizing the solvents generally employed in solvent dewaxing. Oil-bearing waxes are blended with the solvent at a sufficiently high temperature to insure mutual solution and the mixture is cooled to a temperature less than about 100° F., for example about 0 to 100° F., preferably about 15 to 60° F., to precipitate the wax phase. The wax phase is then removed by filtering or centrifuging the mixture and recovered by distilling off the volatile solvent. At least 25 volume percent of oil and oily wax is generally separated in a deoiling process and more commonly about 40 to 60 volume percent of oil or oil and wax is separated. The exact percentage of oil and oily wax separated is largely dependent on the hardness desired of the wax component.

The ketone or ketones ordinarily employed are selected from a large class of wax precipitants such as the lower dialkyl ketones, acetone, diethyl ketone, methylethyl ketone, methylpropyl ketone, methylisobutyl ketone, dipropyl ketone, etc. The low boiling aromatic hydrocarbon, which acts as an oil solvent and boils at a temperature lower than the oil, is usually benzene or toluene or a mixture thereof. These aromatics are more volatile than the oil to permit separation of the solvent by distillation. The optimum ratio of ketone to aromatic solvent and total solvent to oil or wax varies according to the solvents used, the characteristics of the oil or wax treated and the amount of wax present in the mixture. The usual volume ratio of ketone to aromatic solvent is from 1:0 to about 1:2. The ratio of total solvent to oil or wax is generally in the range of about 2:1 to 10:1. The entire amount of solvent may be added to the oil or wax feed before initiating cooling, or the solvent may be added incrementally at various stages of the cooling cycle. Although the present invention will be described with respect to a process for dewaxing or deoiling with a solvent mixture of ketones and how boiling aromatic hydrocarbons, it is not necessarily limited thereto. The scope of the present invention includes the use of wax precipitating solvents such as propane, ethylene dichloride and trichloroethylene for separation of the residual oil and wax.

It is common knowledge to those familiar with the art that no matter what combination of solvents, dilution ratio or scheme for incremental dilution are used, the efficiency of separation of wax from oil or oil from wax leaves much to be desired. Some of the wax is slow to precipitate from solution and may pass through the filter with the filtrate. Some of the wax, although precipitating from solution does so in such finely divided states or as such highly solvated crystals, that the filtration rate is slow and considerable oil is retained with the crystal masses in spite of efforts to wash the oil through the wax cake with wash solvent. Likewise, if centrifugal force is used to separate the wax phase, efficiency of separation is impaired by the small mass and solvated structure of these wax crystals. These difficulties are most pronounced in the case of residual oils.

Residual oil is obtained from reduced crude and is that portion of petroleum remaining after the more volatile fractions including neutral oils are removed by topping and vacuum distillation. Heretofore, such residual oils have been difficult to dewax efficiently because of the microcrystalline nature of the wax present. This microcrystalline wax normally is slow to precipitate completely from an oil-solvent solution and upon precipitation forms such small crystals that the resulting filter cake has a creamy, sludge-like texture which restricts filtration rate and prevents efficient washing. As a result, dewaxing cost is high because of the slow processing rate and the loss of oil to the cake. Excessive oil in the cake, in turn, amplifies the difficulties of subsequently deoiling the crude wax for production of refined microcrystalline waxes.

It has now been found that the difficulties encountered in the above solvent extraction processes, that is, the solvent dewaxing or solvent deoiling of a mixture of residual oil and crude wax, can be overcame or at least significantly reduced by providing the mixture in the solvent extraction process with a small amount of a polymethylenic resin sufficient to facilitate the separation of the oil and wax. The polymethylenic resin, although not necessarily added as a liquid, at least becomes dispersed as a liquid in the residual oil and wax prior to their separation. By polymethylenic resin is meant any of the hydrocarbons of $$(-CH_2-)_n$$

structure. These resins have molecular weights of at least about 750, preferably at least about 2000, and are essentially of polymethylenic configuration and can be obtained from various sources, for instance, by ethylene polymerization.

The improved process of the present invention may be most conveniently carried out by incorporating into a waxy residual oil prior to solvent dewaxing, i.e. prior to separation of the oil and wax, at least about .005 percent by weight based on the residual oil and wax, preferably .02 to 1.0 percent by weight, of the polymethylenic resin. We have not found any particular upper limit on the amount of resin which can be used, but there should be no advantage associated with the use of more than about 5% which would justify the cost. The incorporation of the polymethylenic resin can be accomplished by adding it directly to the oil and agitating at a sufficiently high temperature to effect solution. Or, if preferred, the resin can be dissolved in a small portion of hot solvent or hot oil to form a concentrate which, in turn, can be dissolved readily in the hot oil. After solvent dewaxing, the resulting crude wax is found to contain the polymethylenic resin intimately blended therewith. Hence, the crude wax is provided with an amount of polymethylenic resin whose presence will greatly reduce the difficulties encountered upon subsequently solvent deoiling of the crude wax.

In the alternative, should there be no concern with solvent dewaxing, but only with solvent deoiling of a residual oil-bearing wax, the small amount of resin may be provided in the deoiling process prior to separation of the residual oil and wax, for instance by sufficiently heating the oil-bearing wax until it reaches a molten state and then incorporating the polymethylenic resin. Preferably, the resin is first dissolved in a small portion of hot solvent prior to incorporation.

The type of polymethylenic resin suitable for the present invention can vary and is dispersible as a liquid in the mixture of residual oil and wax. These resins include, for instance, polyethylene polymers of about 1000 to 200,000 or 1,000,000 or more molecular weight, preferably about 2,000 to 12,000 molecular weight. The polyethylenes are commercially available and can be prepared, for example, by compressing ethylene under superatmospheric pressures in excess of over 500 atmospheres and allowing it to react or polymerize under controlled temperature conditions generally in the range of about 100 to 400° C. with small quantities of oxygen being added to the reaction to catalyze the polymerization. The degree of branching in the polymers can vary, for instance polyethylenes of about 0.85 to 0.95 density can be employed.

Also useful for the present invention is the so-called low pressure polyethylene, that is, polyethylene produced by the use of pressures not exceeding about 2000 p.s.i. as distinguished from the above so-called high pressure polyethylene prepared by the high pressure method wherein the pressures range from about 500 up to 1000 atmospheres or more. Useful low pressure polyethylenes are "Marlex 50" and the Ziegler-type polyethylene. "Marlex 50" is a commercially available polymer manufactured by the Phillips Petroleum Company. The properties of this polymer are described in detail in papers entitled "Molecular Structure of Marlex Polymers" by D. C. Smith and "Properties of Marlex 50 Ethylene Polymers" of R. Verbon Jones and P. J. Boeke, published by the Division of Petroleum Chemistry, American Chemical Society, General Papers, Preprints, Col. 1, No. 1, February 1956, pages 219–239. The Ziegler-type low pressure polyethylene is produced by the use of particular catalysts. The catalysts and process are described in Belgian Patents Nos. 533,362; 534,792; 534,888; 538,782 and 527,736.

Oxidized polymethylenic resins having molecular weights of at least about 750, preferably at least about 2000 are also very effective in the present invention. By oxidized polymethylenic resin is meant any of the hydrocarbons predominantly of $(-CH_2-)_n$ structure which have been oxidized through reaction with oxygen sufficient to introduce carboxylic groups. At least two examples of oxidized polyethylene are now commercially available. "Epolene E" is marketed by Eastman Chemical Products, Inc. It has an average molecular weight of about 2500, an acid number of about 8–12, and a saponification number of about 20–25. A=C Polyethylene 629, marketed by Semet-Solvay Petrochemical Division, has an average molecular weight of about 2000, an acid number of about 14–17, and a saponification number of about 25–30. In addition, polyethylenes of higher molecular weight can be partially oxidized to form products satisfactory for purposes of this invention.

Polymethylenic resin as used in this specification is also meant to include Fischer-Tropsch wax which in addition has been found effective in the present invention. Fischer-Tropsch wax is a hard long-chained hydrocarbon composed of linear methylene groups and resembling polyethylene in physical and chemical properties. It can have a molecular weight of about 500 to 1500 and a melting point of about 205° F. to 210° F.

Although the higher molecular weight polymethylenic resins are suitable for use in the present invention, normally, it can be considered advantageous to use a lower molecular weight resin because it is more readily soluble in oil or solvent.

The addition of a polymethylenic resin to a waxy residual oil results in the following advantages to the subsequent dewaxing operation: (1) more rapid and complete wax precipitation, (2) lower pour point for a given set of dewaxing conditions, (3) increased oil yield, (4) greatly increased filtration rate, (5) as an alternative to increased filtration rate a more concentrated oil solution can be processed at a given rate, affording greater production per day without increase in refrigeration cost, and lower pour point oil due to decreased solvent concentration, (6) formation of easily filterable crystals reducing the tendency for formation of "after haze" or cloudiness in oil, and (7) production of crude wax of lower oil content.

In addition to the advantages apparent in the dewaxing process, major advantages are also found when crude wax containing small amounts of polymethylenic resin is deoiled; for example, increased filtration rate and a more complete and perfect separation of oil from wax.

The following examples are included to further describe the present invention but are not to be considered as limiting the invention.

*Example 1*

A quantity of a waxy residual lubricating oil stock was prepared from a Mid-Continent-type crude by vacuum distillation to substantially remove all components boiling below 850° F. at 760 mm., followed by conventional propane deasphalting to remove asphaltic components and conventional phenol extraction to remove aromatic components. The resulting waxy oil had the following properties.

Bravity, ° API (ASTM D–287) _____ 27.9
Viscosity, SSU/210 (ASTM D–88) _____ 127
Flash, ° R. (ASTM D–92) _____ 595
Pour, ° F. (ASTM D–97) _____ 115

A sample of this oil was dewaxed in the following manner. One volume of oil (1130 g.) was blended with 3 volumes of solvent comprised of a 60:40 volume blend of toluene and methyl ethyl ketone, and the mixture heated to 165° F. to form a clear solution. To this solution was added 0.28 gram of 4000 molecular weight polyethylene (density 0.89) dissolved in 20 cc. of hot toluene. The resulting mixture was cooled with moderate agitation to −10° F. at an average rate of 3° F./min. and vacuum filtered and washed through a canvas covered filter leaf operating with 25 inches of mercury pressure differential and using 2 volumes of wash solvent of the same composition as the diluent solvent. Filtration was accomplished by immersing the filter leaf in the oil solution to form a cake of about ¼ inch thickness, removing the leaf, immersing the leaf in −12° F. wash solvent to pass a proportionate amount through the cake, then removing the cake from the filter leaf and repeating the cycle until completion. The solvent was separated from the residual oil and wax by distillation.

Another sample of the oil was similarly treated except that the polymethylenic additive was Fischer-Tropsch wax having a molecular weight of about 750 and a melting point of 205 to 210° F.

For comparison, an identical quantity of oil was dewaxed under identical conditions, except that no polyethylene additive was used. Results of these operations are summarized in Table I.

TABLE I

| Dewaxing | A | B | C |
|---|---|---|---|
| Polyethylene additive, wt. percent on oil | None | 0.025 | 0.1 |
| Time required to filter and wash, min | 95 | 45 | 60 |
| Yield of dewaxed oil, wt. percent | 65.8 | 73.0 | 69.8 |
| Yield of crude wax, wt. percent | 34.2 | 27.0 | 31.2 |
| Pour point of dewaxed oil, ° F | +15 | +10 | +15 |
| Percent oil in crude wax (D–721–56T) | 9.5 | 3.4 | 6.8 |

The improved rate and increased effectiveness of Dewaxing B and C compared to Dewaxing A are clearly apparent.

Example II

A series of dewaxings are carried out on the waxy oil described in Example I. The dewaxing procedure of Example I was used except that a 6/1 dilution solvent to oil ratio was used and the oil charge was reduced to one-half the amount of that of Example I. Also the amount and type of additive was varied as noted in Table II in which results are summarized.

TABLE II

| Dewaxing | D | E | F | G | H | I | J | K |
|---|---|---|---|---|---|---|---|---|
| Polyethylene: | | | | | | | | |
| Percent on oil | None | [1] 0.05 | 0.05 | 0.05 | 0.05 | 0.008 | [2] 0.2 | [3] 0.2 |
| Mol. wt. | | 2,000 | 2,000 | 4,000 | 12,000 | 100,000+ | | |
| Density | | 0.93 | 0.92 | 0.89 | 0.91 | 0.94 | | |
| Operation time, min | 45 | 12 | 15 | 16 | 15 | 27 | 170 | 45 |
| Dewaxed oil yield, wt. percent | 76 | 76 | 76 | 77 | 77 | 76 | | |
| Crude wax yield, wt. percent | 24 | 24 | 24 | 23 | 23 | 24 | | |
| Dewaxed oil pour point | +30 | +20 | +25 | +20 | +20 | +20 | | |

[1] Oxidized polyethylene, acid number 15. (A-C Polyethylene 629).
[2] Refined tank bottoms microcrystalline wax, M.P. 195° F., mol. wt. approx. 850.
[3] Oxidized refined tank bottoms wax, M.P. 185° F.

Table II illustrates the improvement in filtration rate and pour point resulting from various polyethylene additives. Oil yields are little affected in these cases as the relatively high dilution of the waxy oil permits quite effective, though slow, filtration where no additive is used. The fact that some hydrocarbons are not effective as additives in this process is illustrated by Dewaxing J and K. The tank bottoms wax is very deleterious. The same type of microcrystalline wax in partially oxidized state produces little or no effect.

Example III

The crude wax product from Dewaxing A, Example I, was deoiled by blending with 8 volumes of solvent of the composition of Example I, heating to 165° and cooling to 50° F. with moderate agitation at an average rate of 6° F./min. The mixture was filtered as in Example I and washed with 4 volumes of solvent. The crude wax from Dewaxing B was also dewaxed under the same conditions. The solvent was separated from the residual oil and wax by distillation. Results of these operations are summarized in Table III.

TABLE III

| | Deoiling No. | |
|---|---|---|
| | A | B |
| Feedstock source, crude wax from | Dewaxing A | Dewaxing B |
| Polyethylene conc., percent on wax charge | | 0.09 |
| Polyethylene present | None | ([1]) |
| Operation time, min | 38 | 18 |
| Yield of deoiled wax, wt. percent | 44.5 | 41.7 |
| Percent oil in deoiled wax | 6.5 | 0.73 |
| Pour point of filtrate oil | 120 | 100 |

[1] Present in feedstock.

As shown by Deoiling B in Table III, the presence of polyethylene additive retained in the crude wax from the previous dewaxing resulted in marked reduction in time required to accomplish the deoiling filtration. Furthermore, a much cleaner separation was achieved. The resulting wax was relatively oil-free while the wax from Deoiling A still contained a large percentage of oil. Furthermore, because a certain fraction of the desired wax was reluctant to crystallize from solution, some of this fraction, in Deoiling A, passed through the filter into the filtrate where it caused an increase of 20° F. in pour point compared to that of the filtrate product recovered from Deoiling B.

As the polyethylene additive after solvent dewaxing remains with the wax fraction, it ultimately will be present in the wax recovered from the final deoiling operation. At this point it may be removed, if desired, by filtering the wax at a temperature below the cloud point and above the wax melting point. Or it may be desirable to leave the polyethylene in the wax. The amount present is very small—normally much less than 1%—and the slight effect it produces on the finished wax will tend to be a beneficial one in most cases.

We claim:

1. In a solvent extraction process for separating a mixture of residual petroleum oil and crude wax through treatment with a wax precipitating solvent, the improvement which comprises providing as a dispersed liquid in said mixture at least about .005 percent by weight based on the residual oil and wax of a normally solid material selected from the group consisting of Fischer-Tropsch hydrocarbon wax having a molecular weight of about 500 to 1500, polyethylene and carboxylic group-containing oxidized polyethylene, said oxidized polyethylene having an average molecular weight of at least about 750, said polyethylene having an average molecular weight of at least about 100,000 and said dispersed material being present in an amount sufficient to facilitate separation of oil and wax.

2. The process of claim 1 in which the normally solid material is a normally solid polymer of ethylene having a molecular weight of about 100,000 to 1,000,000.

3. The process of claim 1 wherein the normally solid material is the carboxylic group-containing oxidized polyethylene.

4. The process for solvent dewaxing a natural wax-bearing residual petroleum lubricating oil which comprises dissolving in said oil 0.005–2.0% by weight of a synthetic hydrocarbon of the group consisting of Fischer-Tropsch hydrocarbon waxes having average molecular weights of 500–1000 and normally solid polyethylenes having average molecular weights of at least about 100,000, and a dewaxing solvent, chilling the mixture to precipitate natural wax and passing it to a filter whereby the precipitated wax is separated from oil.

5. In a process for ketonic solvent dewaxing a waxy residual petroleum oil, the improvement which comprises providing as a dispersed liquid in said waxy oil about .005 to 1 percent by weight based on the residual oil and wax of a normally solid material selected from the group consisting of Fischer-Tropsch hydrocarbon wax having a molecular weight of about 500–1500, polyethylene and carboxylic group-containing oxidized polyethylene, said oxidized polyethylene having an average molecular weight of at least about 750, said polyethylene having an average molecular weight of at least about 100,000 and said normally solid material being present in an amount sufficient to facilitate the separation of oil and wax.

6. The process of claim 5 wherein the normally solid material is the carboxylic group-containing oxidized polyethylene.

7. The process of claim 5 in which the normally solid material is a normally solid polymer of ethylene having a molecular weight of about 100,000 to 1,000,000.

8. In a process for ketonic solvent deoiling a residual petroleum oil-containing wax, the improvement which comprises providing as a dispersed liquid in said oily wax about .005 to 1 percent by weight based on the residual oil and wax of a normally solid material selected from the group consisting of Fischer-Tropsch hydrocarbon wax having molecular weight of about 500–1500, carboxylic group-containing oxidized polyethylene having an average molecular weight of at least about 750, said polyethylene having an average molecular weight of at least about 100,000 and said material being present in an amount sufficient to facilitate the separation of oil and wax.

9. The process of claim 8 in which the normally solid material is a normally solid polymer of ethylene having a molecular weight of about 100,000 to 1,000,000.

10. The process for solvent dewaxing a natural wax-bearing residual petroleum lubricating oil which comprises dissolving in said oil 0.005–2.0% by weight of normally solid polyethylene having an average molecular weight of at least about 100,000 and a dewaxing solvent, chilling the mixture to precipitate natural wax and passing it to a filter whereby the precipitated wax is separated from oil.

11. The process of claim 8 wherein the normally solid material is the carboxylic group-containing oxidized polyethylene.

12. In a process for ketonic solvent dewaxing a waxy residual petroleum oil, the improvement which comprises providing as a dispersed liquid in said waxy oil at least about .005 to 1 percent by weight based on the residual oil and wax of Fischer-Tropsch hydrocarbon wax having an average molecular weight of about 500 to 1500.

13. The process for solvent dewaxing a natural wax-bearing residual petroleum lubricating oil which comprises dissolving in said oil 0.005 to 2.0% by weight of an oil-soluble normally solid polymer of ethylene having an average molecular weight of at least about 100,000 and a dewaxing solvent, chilling the mixture to precipitate natural wax, and passing it to a filter whereby the precipitated wax is separated from oil.

14. The process for solvent dewaxing a natural wax-bearing residual petroleum lubricating oil which comprises dissolving in said oil 0.005 to 2.0% by weight of an oil-soluble normally solid material selected from the group consisting of Fischer-Tropsch hydrocarbon wax having a molecular weight of 500 to 1000, polyethylene and carboxylic group-containing oxidized polyethylene, said oxidized polyethylene having an average molecular weight of at least 750, said polyethylene having an average molecular weight of at least about 100,000 and a dewaxing solvent, chilling the mixture to precipitate natural wax, and passing it to a filter whereby the precipitated wax is separated from oil.

15. The process for solvent dewaxing a natural wax-bearing residual petroleum lubricating oil which comprises dissolving in said oil 0.005 to 2.0% by weight of an oil-soluble normally solid polyethylene having an average molecular weight of at least about 100,000 and a dewaxing solvent, chilling the mixture to precipitate natural wax, and passing it to a filter whereby the precipitated wax is separated from oil.

16. The process for ketonic solvent dewaxing a natural wax-bearing residual petroleum lubricating oil which comprises dissolving in said oil 0.005 to 2.0% by weight of a synthetic hydrocarbon of the group consisting of Fischer-Tropsch hydrocarbon wax having average molecular weight of 500–1000 and oil-soluble polyethylene having average molecular weight of at least about 100,000 and a density of .89 to .95, and a ketonic dewaxing solvent, chilling the mixture to precipitate natural wax and passing it to a filter whereby the precipitated wax is separated from oil.

17. The process for solvent dewaxing a natural wax-bearing residual petroleum lubricating oil which comprises dissolving in said oil 0.005 to 2.0% by weight of a normally solid polymer of ethylene having an average molecular weight of about 100,000 to 1,000,000 and a dewaxing solvent, chilling the mixture to precipitate natural wax, and passing it to a filter whereby the precipitated wax is separated from oil.

18. The process for solvent dewaxing a natural wax-bearing residual petroleum lubricating oil which comprises dissolving in said oil a normally solid material selected from the group consisting of Fischer-Tropsch hydrocarbon wax having a molecular weight of 500 to 1000, polyethylene and carboxylic group-containing oxidized polyethylene, said oxidized polyethylene having an average molecular weight of 1000 to 10,000, said polyethylene having an average molecular weight of at least about 100,000 and a dewaxing solvent, chilling the mixture to precipitate natural wax, and passing it to a filter whereby the precipitated wax is separated from oil.

19. The process for solvent dewaxing a natural wax-bearing residual petroleum oil which comprises dissolving in said oil at least about .005 percent by weight based on the residual oil and wax of a normally solid material selected from the group-consisting of Fischer-Tropsch hydrocarbon wax having a molecular weight of about 500–1500, polyethylene and carboxylic group-containing oxidized polyethylene, said oxidized polyethylene having an average molecular weight of at least about 750, said polyethylene having an average molecular weight of at least about 100,000 and a dewaxing solvent, chilling the mixture to precipitate natural wax, and passing it to a filter whereby the precipitated wax is separated from oil.

20. In a process for ketonic solvent deoiling a residual petroleum oil containing wax, the improvement which comprises providing as a dispersed liquid in said oily wax about .005 to 1 percent by weight based on the residual oil and wax of Fischer-Tropsch hydrocarbon wax having an average molecular weight of about 500 to 1500.

21. The process for solvent dewaxing a natural wax-bearing residual petroleum lubricating oil which comprises dissolving in said oil 0.005 to 2.0% by weight of a synthetic hydrocarbon of the group consisting of Fischer-Tropsch hydrocarbon wax having an average molecular weight of 500–1000 and oil-soluble polyethylene having an average molecular weight of at least about 100,000 and a density of .89 to .95 and a dewaxing solvent, chilling the mixture to precipitate natural wax and passing it to a filter whereby the precipitated wax is separated oil.

22. The process for ketonic solvent dewaxing a natural wax-bearing residual petroleum lubricating oil which comprises dissolving in said oil 0.005–2.0% by weight of a synthetic hydrocarbon of the group consisting of Fischer-Tropsch hydrocarbon wax having an average molecular weight of 500–1000 and oil-soluble, normally solid polyethylene having an average molecular weight of at least about 100,000, and a ketonic dewaxing solvent, chilling the mixture to precipitate natural wax and passing it to a filter whereby the precipitated wax is separated from oil.

References Cited

UNITED STATES PATENTS

| | | | |
|---|---|---|---|
| 2,081,297 | 5/1937 | Garofalo et al. | 208—28 |
| 2,081,519 | 5/1937 | Wade | 208—37 |
| 2,147,573 | 2/1939 | Cook et al. | 208—33 |
| 2,229,659 | 1/1941 | Carr | 208—31 |
| 2,379,728 | 7/1945 | Lieber et al. | 208—28 |
| 2,903,411 | 9/1959 | Schuman | 208—33 |
| 2,914,471 | 11/1959 | Rausch | 260—674 |
| 2,949,418 | 8/1960 | Jezl | 208—31 |

(Other references on following page)

OTHER REFERENCES

Kalichevsky "Petroleum Refining With Chemicals," pp. 415, 427, 428, 541 to 543, Pub. Elsevier Pub. Co., New York, 1956.

Warth "The Chemistry and Technology of Waxes" Second Edition, 1956, Pub. by Reinhold Pub. Corp., New York.

DELBERT E. GANTZ, *Primary Examiner.*

ALLAN M. BOETTCHER, ALPHONSO D. SULLIVAN, MILTON STERMAN, PAUL M. COUGHLAN, *Examiners.*

F. M. VAN RIET, J. H. HALL, H. LEVINE, *Assistant Examiners.*